J. T. HART.
Churning-Apparatus.
No. 215,352.    Patented May 13, 1879.
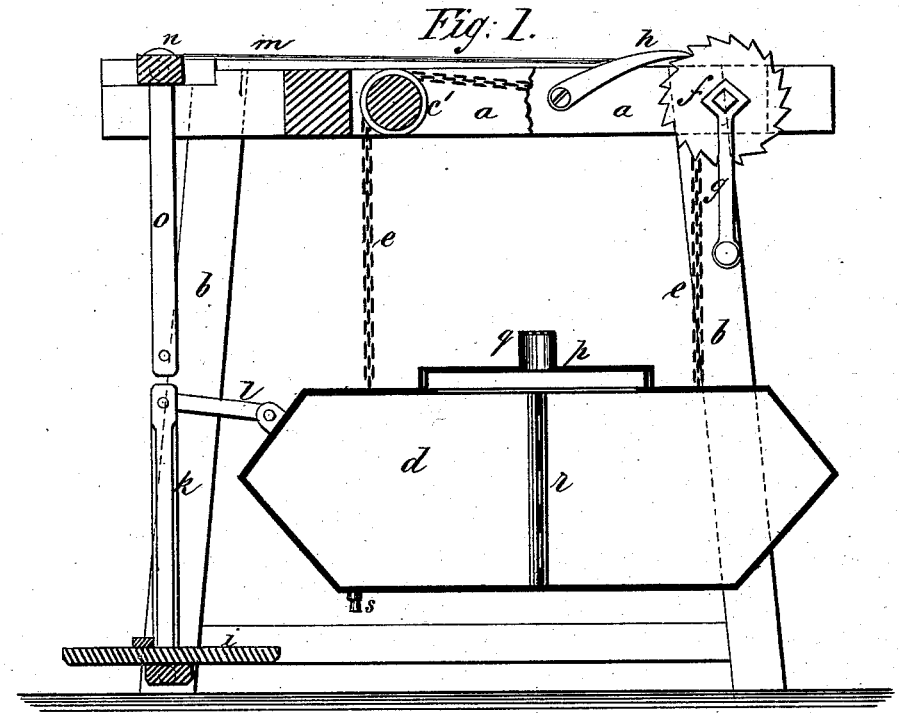
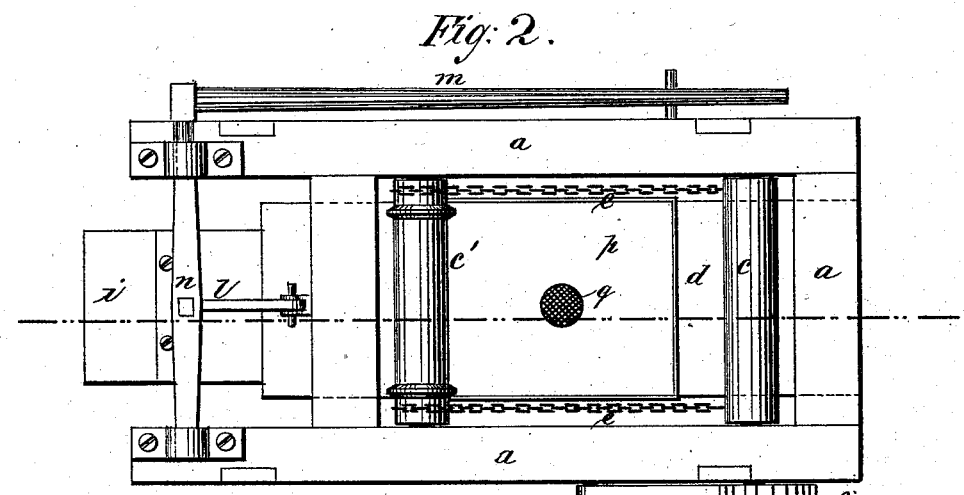
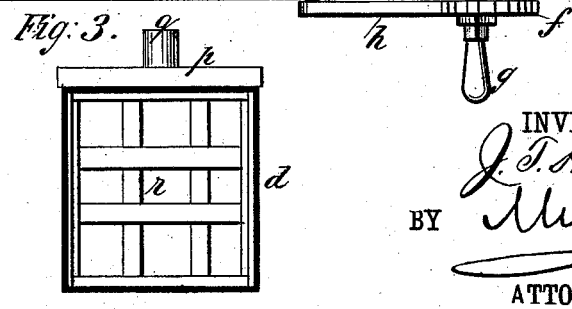
WITNESSES:
A. Schrehl.
C. Sedgwick
INVENTOR:
J. T. Hart
BY Munn & Co.
ATTORNEYS.

UNITED STATES PATENT OFFICE.

JOEL T. HART, OF GREENWOOD, MISSOURI.

IMPROVEMENT IN CHURNING APPARATUS.

Specification forming part of Letters Patent No. 215,352, dated May 13, 1879; application filed October 14, 1878.

*To all whom it may concern:*

Be it known that I, JOEL TANNER HART, of Greenwood, in the county of Jackson and State of Missouri, have invented a new and Improved Churning Apparatus, of which the following is a specification.

The invention is an improvement in the class of churns whose box or body is suspended by rods or chains in such manner as to adapt it to be oscillated.

The improvement consists in the combination of a treadle-lever mechanism with a suspended churn-box.

In the accompanying drawings, Figure 1 is a vertical longitudinal section of my churning apparatus. Fig. 2 is a plan view of the same; and Fig. 3 is a cross-section of the churn-box.

Similar letters of reference indicate corresponding parts.

$a$ is a rectangular frame, of wood, supported on legs $b$, at a convenient height from a floor. $c\ c'$ are rollers, journaled in the frame $a$, at opposite ends of the same. The churn-box $d$ is suspended below frame $a$ by the chains $e\ e$, there being two of these chains at each end of box $d$. Those at one end are connected directly to the roller $c$, while the chains $e$ at the other end pass around the roller $c'$, and from thence to roller $c$.

One end of $c$ projects outside of frame $a$, and carries a ratchet-wheel, $f$, and crank-handle $g$, so that by turning the crank $g$ the chains $e$ will be wound or unwound, and the churn $d$ raised or lowered.

$h$ is a pawl, engaging with the teeth of $f$, to hold it in any desired position. $i$ is a treadle upon a rock-shaft, that is journaled between legs $b$. $k$ is an arm from the treadle $i$, extending upward and formed with a forked end, for connection of the link $l$, which is hung on one end of churn-body $d$.

By this connection the churn may be oscillated by the treadle; or it may be swung by hand by connecting the link $l$ to the arm or crank $o$ of the rock-shaft $n$, that is journaled at the upper side of frame $a$, and is provided with a hand-lever, $m$, by which the churn may be operated.

The churn-body is to be raised by means of crank $g$, as desired, to bring the pivot of the link $l$ in line horizontally with its connection to $k$ or $o$, as the case may be.

The upper side of the churn-body $d$ has an opening cut in it for filling the churn or removing the butter. This opening is provided with a cover, $p$, that has an air-tube, $q$, in the center, which is covered by wire-gauze. This permits free access of air, but prevents spattering of the contents through the air-tube.

$s$ is a tube from the under side of churn $d$, for drawing off the buttermilk. It will be stopped by a stopper of wood or cork when the churn is in use.

The box $d$ is divided by a cross-partition, $r$, midway of its length, which partition is made removable from the box, and consists of slats forming open or lattice work, which serves to separate the cream into small streams, and cause a percussive action upon the same as it moves from one end of the churn to the other during the process of churning.

When not in use, or when it is desired to clean the churn or prepare it for use, the churn will be raised up close to the frame $a$.

The treadle forms a convenient means for swinging the churn-box, and is especially adapted for grown persons, while the hand-lever can be used by children.

The motion imparted to the cream by the oscillations of the churn is very efficacious in separating the butter, and the labor of churning is reduced to a minimum.

This apparatus is adapted for churning large quantities of cream.

Having thus described my invention, I claim as new and desire to secure by Letters Patent—

In a churning apparatus, the combination of the treadle $i$, having arm $k$, the link $l$, the churn-box $d$, and the chains and rollers for suspending said churn-box, all as shown and described.

JOEL TANNER HART.

Witnesses:
F. T. McCULLOUGH,
JAMES McKITTERICK.